United States Patent [19]

Suzuki et al.

[11] Patent Number: 4,563,409

[45] Date of Patent: Jan. 7, 1986

[54] AZO MOIETY CONTAINING METAL COMPLEXES IN TONERS

[75] Inventors: Nobuo Suzuki, Shobu; Takeo Kurahashi, Yokohama; Katsuichi Motohashi, Urawa; Genpei Sugiyama; Takayuki Sakai, both of Tokyo, all of Japan

[73] Assignee: Hogohaya Chemical Co., Ltd., Tokyo, Japan

[21] Appl. No.: 668,323

[22] Filed: Nov. 5, 1984

[30] Foreign Application Priority Data

Nov. 4, 1983 [JP] Japan ................................ 58-205879
Nov. 4, 1983 [JP] Japan ................................ 58-205880
Nov. 8, 1983 [JP] Japan ................................ 58-208256
Nov. 8, 1983 [JP] Japan ................................ 58-208257

[51] Int. Cl.$^4$ ............................................. G03G 9/08
[52] U.S. Cl. ................................... 430/106; 430/110; 534/613
[58] Field of Search ................. 430/106, 110; 534/613

[56] References Cited

U.S. PATENT DOCUMENTS 3,497,493  2/1970  Grossmann ........................ 534/6.3
4,433,040  2/1984  Niimura et al. ................. 430/110 X

FOREIGN PATENT DOCUMENTS 49-27229   3/1974  Japan ................................ 430/106
52-67331   6/1977  Japan ................................ 430/106
57-167033 10/1982  Japan ................................ 430/106
58-208750 12/1983  Japan ................................ 430/106
367584    11/1963  Switzerland ...................... 534/613

Primary Examiner—Roland E. Martin
Attorney, Agent, or Firm—Oblon, Fisher, Spivak, McClelland & Maier

[57] ABSTRACT

A symmetric 2:1 metal complex represented by the general formula:

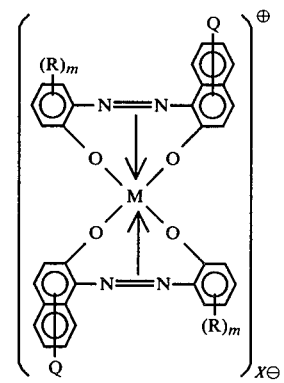

where R is a hydrogen atom, an alkyl group having from 1 to 10 carbon atoms, an alkoxy group having from 1 to 4 carbon atoms, an alkoxycarbonyl group having from 2 to 5 carbon atoms, an acyl group having from 2 to 5 carbon atoms, an aminocarbonyl group, an alklyaminocarbonyl group having from 2 to 5 carbon atoms, an alkylsulfonyl group having from 1 to 3 carbon atoms, an aminosulfonyl group, an acylamino group having from 2 to 5 carbon atoms, a nitro group, a cyano group or a halogen atom, m is an integer of from 1 to 4, when m is 2 or more, the plurality of R may be the same or different substituents, Q is —NHCO—Y—Z or —CONH—Y—Z (where Y is an alkylene group having from 1 to 4 carbon atoms, and Z is a quaternary ammonium group), M is a chromium atom or a cobalt atom, and X$^\ominus$ is an anion.

4 Claims, No Drawings

AZO MOIETY CONTAINING METAL COMPLEXES IN TONERS

The present invention relates to a metal complex and an electrophotographic toner containing the metal complex.

In electrophotography, it is common to employ a method which comprises forming an electrostatic latent image on a photoconductor made of e.g. a photoconductive material, then developing the latent image with a powder developer to form a visible image, and further fixing the image by heat or a solvent.

As the developer for such electrophotography, it is common to use a mixture comprising fine powder composed of a resin and a coloring agent, which is generally called a toner, and fine glass beads or iron powder, which is generally called a carrier.

The present invention relates to this developing powder called a toner and a novel metal complex useful for the toner.

A photoconductive layer can be positively or negatively charged, and a positively or negatively charged electrostatic latent image can be formed in the photoconductive layer by exposing it with an original overlaid thereon. When a negatively charged electrostatic latent image is developed with a positively charged toner, a positive-positive image corresponding to the original will be formed. However, when a positively charged electrostatic latent image is developed with a negatively charged toner, a negative image of the original, i.e. a positive-negative image, where the black and white tones are reversed, will be obtained. Thus, as electrophotographic toners, there are two types of toners, i.e. one being a positively charged toner and the other being a negatively charged toner.

The present invention relates to a positively chargeable toner.

In general, such a toner is fine powder obtained by mixing a coloring agent such as a dyestuff or a pigment, to a synthetic resin.

In order to positively charge the toner, the electrostatic characteristics of the dyestuff play an important role so that the dyestuff serves not only as a coloring agent but also as an electric charge-controlling agent.

As a positive charge-controlling agent, basic dyestuffs such as Nigrosine have been employed. However, the conventional dyestuffs such as Nigrosine have drawbacks such that there is a substantial variation in the electric chargeability among production lots, and when formed into a toner the durability of the toner for continuous repeated use for photocopying is not good.

The present inventors have conducted extensive researches to solve the above problems, and have found certain metal complexes having a positive charge-controlling ability and good compatibility with resins. It is thereby possible to obtain excellent toners free from the above-mentioned problems.

Namely, the present invention provides a symmetric 2:1 metal complex represented by the general formula:

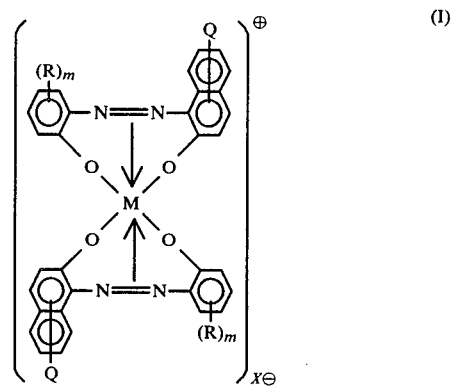

where R is a hydrogen atom, an alkyl group having from 1 to 10 carbon atoms, an alkoxy group having from 1 to 4 carbon atoms, an alkoxycarbonyl group having from 2 to 5 carbon atoms, an acyl group having from 2 to 5 carbon atoms, an aminocarbonyl group, an alkylaminocarbonyl group having from 2 to 5 carbon atoms, an alkylsulfonyl group having from 1 to 3 carbon atoms, an aminosulfonyl group, an acylamino group having from 2 to 5 carbon atoms, a nitro group, a cyano group or a halogen atom, m is an integer of from 1 to 4, when m is 2 or more, the plurality of R may be the same or different substituents, Q is —NHCO—Y—Z or —CONH—Y—Z (where Y is an alkylene group having from 1 to 4 carbon atoms, and Z is a quaternary ammonium group), M is a chromium atom or a cobalt atom, and $X^{\ominus}$ is an anion.

The present invention also provides an electrophotographic toner containing the metal complex of the formula I as an electric charge-controlling agent or a coloring agent.

Now, the present invention will be described in detail with reference to the preferred embodiments.

The metal complex of the formula I of the present invention may be prepared in good yield by diazotizing a diazo component represented by the general formula:

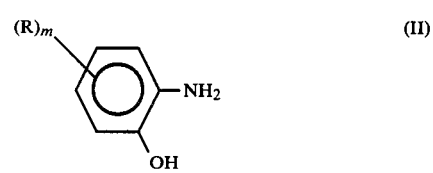

where R and m are as defined above, by a conventional method, then coupling the resulting diazo compound with a coupling component represented by the general formula:

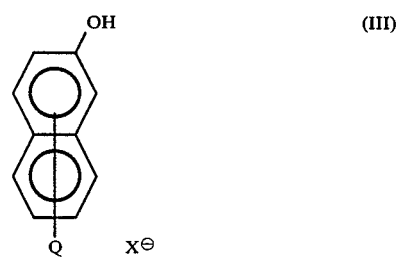

where $X^\ominus$ and Q are as defined above, by a conventional method, to obtain a monoazo compound represented by the general formula:

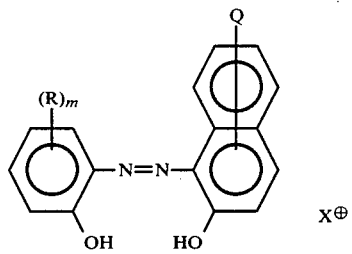

(IV)

where R, m, $X^\ominus$ and Q are as defined above, and then heat-treating this monoazo compound with a chromium-introducing agent or a cobalt-introducing agent in water or in an organic solvent by a conventional method. As the diazo component of the formula II which may be used in the present invention, there may be mentioned, for instance, 3-chloro-2-aminophenol, 4-chloro-2-aminophenol, 4-bromo-2-aminophenol, 5-bromo-2-aminophenol, 4-iodo-2-aminophenol, 3,5-dichloro-2-aminophenol, 4,6-dichloro-2-aminophenol, 3,4,6-trichloro-2-aminophenol, 4-nitro-2-aminophenol, 5-nitro-2-aminophenol, 6-chloro-4-nitro-2-aminophenol, 4-chloro-5-nitro-2-aminophenol, 4-chloro-6-nitro-2-aminophenol, 6-bromo-4-nitro-2-aminophenol, 4-methyl-2-aminophenol, 4-t-butyl-2-aminophenol, 4-t-octyl-2-aminophenol, 4,5-dimethyl-2-aminophenol, 4-methoxy-2-aminophenol, 4-methyl-5-nitro-2-aminophenol, 4-bromo-5-methyl-2-aminophenol, 4-cyano-2-aminophenol, 4-acetyl-2-aminophenol, 4-methoxycarbonyl-2-aminophenol, 4-aminocarbonyl-2-aminophenol, 4-ethylaminocarbonyl-2-aminophenol, 4-aminosulfonyl-2-aminophenol and 4-propylsulfonyl-2-aminophenol.

As the coupling component of the formula III where Q is —NHCO—Y—Z, there may be mentioned N,N,N-trimethyl-N-[N'-(7-hydroxy-1-naphthyl)carbamoyl]methylammonium chloride, N,N,N-trimethyl-N-[N'-(6-hydroxy-1-naphthyl)carbamoyl]methylammonium chloride, N,N,N-triethyl-N-[N'-(7-hydroxy-1-naphthyl)carbamoyl]methylammonium chloride, N,N-dimethyl-N-ethyl-N-[N'-(7-hydroxy-1-naphthyl)carbamoyl]methylammonium iodide, N,N-dimethyl-N-n-butyl-N-[N'-(7-hydroxy-1-naphthyl)carbamoyl]methylammonium bromide, N,N-dimethyl-N-n-butyl-N-[N'-(6-hydroxy-1-naphthyl)carbamoyl]methylammonium chloride, N,N,N-trimethyl-N-[N'-(7-hydroxy-1-naphthyl)carbamoyl]propylammonium chloride, N,N,N-trimethyl-N-[N'-(6-hydroxy-1-naphthyl)carbamoyl]propylammonium chloride, N,N-dimethyl-N-benzyl-N-[N'-(7-hydroxy-1-naphthyl)carbamoyl]methylammonium chloride, N-methyl-N-[N'-(7-hydroxy-1-naphthyl)carbamoyl]propylpiperidinium bromide, N-methyl-N-[N'-(7-hydroxy-1-naphthyl)carbamoyl]methylmorpholinium chloride, N-[N'-(7-hydroxy-1-naphthyl)carbamoyl]methylpyridinium chloride, and N-[N'-(6-hydroxy-1-naphthyl)carbamoyl]methylpyridinium chloride.

Further, as the coupling component of the formula III where Q is —CONH—Y—Z, there may be mentioned N,N,N-trimethyl-N-2-(3-hydroxy-2-naphthamido)ethylammonium chloride, N,N,N-triethyl-N-2-(3-hydroxy-2-naphthamido)ethylammonium chloride, N,N,N-trimethyl-N-3-(3-hydroxy-2-naphthamido)propylammonium bromide, N,N-dimethyl-N-ethyl-N-3-(3-hydroxy-2-naphthamido)propylammonium chloride, N,N,N-trimethyl-N-4-(3-hydroxy-2-naphthamido)butylammonium chloride, N,N-dibutyl-N-methyl-N-3-(3-hydroxy-2-naphthamido)propylammonium chloride, N-methyl-N-3-(3-hydroxy-2-naphthamido)propylpiperidinium bromide, N-methyl-N-3-(3-hydroxy-2-naphthamido)propylmorpholinium chloride and N-2-(3-hydroxy-2-naphthamido)ethylpyridinium chloride.

The metal complex of the formula I of the present invention thus obtained, has a positive chargeability and excellent compatibility with resins, for example, a polymer of styrene or a substituted styrene such as polystyrene or polyvinyl toluene, a styrene-substituted styrene copolymer, a styrene-acrylate copolymer, a styrene-methacrylate copolymer, a styrene-acrylonitrile copolymer, a polyvinyl chloride resin, a polyethylene, a silicone resin, a polyester, a polyurethane, a polyamide, an epoxy resin, a modified rosin or a phenol resin. Thus, the metal complex can uniformly be dispersed in such a resin and further pulverized into fine powder. Such a fine powder also has positive chargeability.

On the other hand, the metal complex of the present invention has little solubility in water, and scarcely affected by the environmental humidity, thus being capable of maintaining the positive chargeability for a long period of time.

In the formula I, $X^\ominus$ is preferably a halogen ion such as a chlorine, bromine, fluorine or iodine ion.

The toner of the present invention may be prepared by melt-mixing from 1 to 50% by weight of the metal complex of the formula I with 50 to 99% by weight of a synthetic resin, and after the solidification, pulverizing the solidified product by means of a ball mill or other pulverizer. Alternatively, it may be prepared by adding a polymerization initiator to a synthetic resin monomer, incorporating from 1 to 50%, by weight of the monomer, of the metal complex of the formula I thereto, and polymerizing the mixture is a suspended state in water. Other coloring agents or carbon black may also be incorporated. The toner thus obtained will provide an electric charge in a quantity suitable for the development of an electrostatic image due to the friction with the carrier, whereby the quantity of the electric charge can be maintained at a constant level during repeated development operations. The distribution of the electric charge is uniform and can be maintained in a stabilized condition for a long period of time. Accordingly, an image developed by means of this toner, is uniform and has a constant image density, and it is very sharp as compared with the image where a conventional positive toner is used.

Now, the present invention will be described in further detail with reference to Examples. However, it should be understood that the present invention is by no means restricted by these specific Examples.

In the Examples, "parts" means "parts by weight".

EXAMPLE 1

14.4 Parts of 4-chloro-2-aminophenol was mixed with 26 parts of concentrated hydrochloric acid and 400 parts of water, and the mixture was cooled with ice to a temperature of from 0° to 5° C. After an addition of 6.9 parts of sodium nitrite, the mixture was stirred at the same temperature for 2 hours for diazotization. The diazo compound thus obtained was subjected to a coupling reaction by pouring it into a solution of a mixture comprising 300 parts of water, 10 parts of sodium hydroxide and 29.3 parts of N,N,N-trimethyl-N-[N'-(7-hydroxy-1-naphthyl)carbamoyl]methylammonium chloride at a temperature of from 0° to 5° C. Then, a monoazo compound having the following structure was isolated.

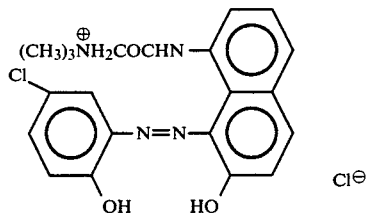

This monoazo compound was dissolved in 120 parts of ethylene glycol, and 17.4 parts of sodium chromium salicylate was added thereto. The mixture was stirred at a temperature of from 85° to 90° C. for a chromium-introducing reaction. Then, the mixture was cooled to 30° C., and hydrochloric acid was added to acidify the mixture to an acidity confirmed by Congo Red. Then, the product was isolated at room temperature, and dried under reduced pressure at 50° to 60° C. to obtain 45 parts of chromium complex of the following formula as a blackish blue fine powder:

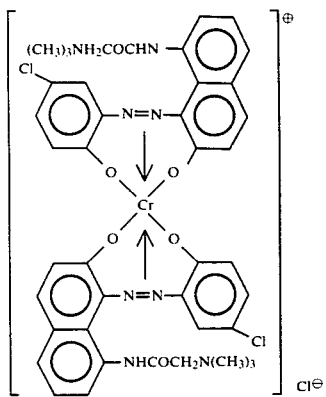

The wavelength at the maximum absorption by this chromium complex was 581 nm as measured in a dimethylformamide solvent.

The coupling component used in this Example was prepared by chloroacetylating 8-amino-2-naphthol in glacial acetic acid with chloroacetic acid chloride by using sodium acetate as an acid binding agent, to obtain 8-chloroacetylamino-2-naphthol, dissolving isolated 8-chloroacetylamino-2-naphthol in acetone, and then blowing gaseous trimethylamine into the solution.

EXAMPLE 2

53.8 Parts of a monoazo dyestuff represented by the formula:

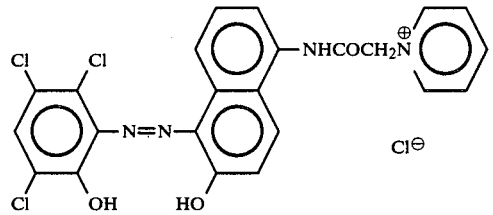

obtained in the same manner as in Example 1, was dissolved in 200 parts of methyl cellosolve, and after an addition of 18.2 parts of sodium chromium salicylate, the mixture was stirred at a temperature of from 100° to 105° C. for 2 hours for a chromium-introducing reaction. Then, the mixture was cooled to 20° C., and then treated in the same manner as in Example 1 to obtain 51.2 parts of a chromium complex of the following formula as a black powder:

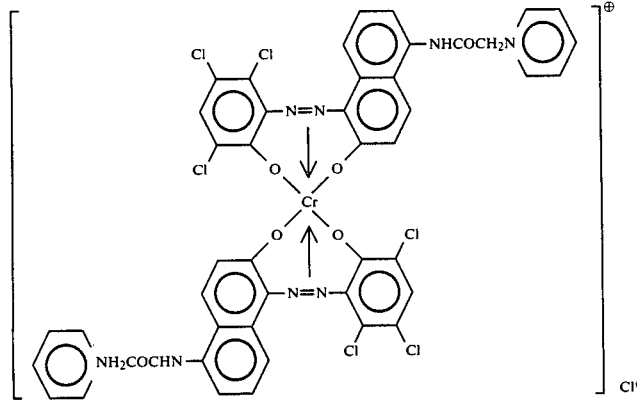

The wavelength at the maximum absorption by this chromium complex was 594 nm as measured in a dimethylformamide solvent.

The coupling component used in this Example was readily prepared by heating 5-chloroacetylamino-2-naphthol in pyridine.

EXAMPLES 3 to 32

In the same manner as in Examples 1 and 2, symmetric 2:1 metal complexes were obtained. The structures, the wavelengths at the maximum absorption (in dimethylformamide) and outer appearance are shown in Table 1.

TABLE 1

Structure:

```
       B—OCHN—⬡
              |
       A—N=N—⬡
              |
              HO
```

| Examples | Monoazo compound | | Central metal | Complexing solvent | Wavelength at the maximum absorption (nm) | Outer appearance |
|---|---|---|---|---|---|---|
| 3 | A: 4-OH, 3-NO₂-phenyl (NO₂, OH substituted phenyl) | B: —CH₂N⁺(CH₃)₃  Cl⁻ | Cr | Ethylene glycol | 576 | Black powder |
| 4 | A: 3,4-dichloro-phenyl (Cl, Cl, OH) | B: —CH₂N⁺(CH₃)₃  Cl⁻ | Cr | Dimethylformamide | 583 | Blackish purple powder |
| 5 | A: NO₂, Cl, OH substituted phenyl | B: —CH₂N⁺(C₂H₅)₃  Cl⁻ | Cr | Ethylene glycol | 592 | Black powder |
| 6 | A: Br—⬡—OH | B: —CH₂N⁺(CH₃)₂(CH₂-C₆H₅)  Cl⁻ | Cr | Water | 597 | Blackish purple powder |
| 7 | A: CN, OH substituted phenyl | B: —C₂H₄N⁺(CH₃)₃  Cl⁻ | Co | Water | 562 | Black powder |
| 8 | A: SO₂NH₂, OH substituted phenyl | B: —CH₂N⁺(CH₃)₂(C₂H₅)  Cl⁻ | Cr | Methyl cellosolve | 585 | Black powder |
| 9 | A: CONHC₂H₅, OH substituted phenyl | B: —CH₂N⁺(CH₃)₃  Cl⁻ | Co | n-Butanol | 560 | Black powder |

TABLE 1-continued

| Examples | Monoazo compound | | Central metal | Complexing solvent | Wavelength at the maximum absorption (nm) | Outer appearance |
|---|---|---|---|---|---|---|
| 10 | A: Cl, Cl, OH (dichloro-methylphenol) | B: —CH₂N⁺(pyridinium) Cl⁻ | Cr | Dimethyl sulfoxide | 592 | Black powder |
| 11 | A: O₂N, Cl, OH | B: —CH₂N⁺(CH₃)₃ Cl⁻ | Cr | Formamide Water | 612 | Black powder |
| 12 | A: Cl, OH | B: —CH₂N⁺(morpholino)CH₃ I⁻ | Cr | Ethylene glycol | 587 | Blackish purple powder |
| 13 | A: O₂N, OH | B: —C₃H₆N⁺(morpholino)CH₃ CH₃SO₄⁻ | Cr | Ethylene glycol | 613 | Black powder |
| 14 | A: O₂N, CONH₂, OH | B: —CH₂N⁺(CH₃)₃ Cl⁻ | Cr | Water Dimethylformamide | 608 | Black powder |
| 15 | A: OCH₃, OH | B: —CH₂N⁺(C₄H₉)₂CH₃ I⁻ | Cr | Ethylene glycol | 589 | Black powder |
| 16 | A: t-C₈H₁₇, OH | B: —CH₂N⁺(CH₃)₃ Cl⁻ | Cr | Ethylene glycol | 590 | Blackish purple powder |
| 17 | A: H₃C, CH₃, OH | B: —CH₂N⁺(pyridinium) Cl⁻ | Cr | Water | 593 | Blackish blue powder |

TABLE 1-continued

| Examples | Monoazo compound A: | B: | Central metal | Complexing solvent | Wavelength at the maximum absorption (nm) | Outer appearance |
|---|---|---|---|---|---|---|
| 18 | CONHC₂H₅, OH (phenyl) | —C₃H₆N⁺(CH₃)₃ Cl⁻ | Co | Ethylene glycol | 559 | Blackish purple powder |
| 19 | t-C₄H₉, OH (phenyl) | —CH₂N⁺(piperidine)CH₃ Cl⁻ | Cr | Methyl cellosolve | 592 | Black powder |
| 20 | SO₂C₃H₇, OH (phenyl) | —CH₂N⁺(CH₃)₃ Cl⁻ | Cr | Diethylene glycol | 588 | Blackish blue powder |
| 21 | I, OH (phenyl) | —CH₂—N⁺(piperidine)CH₃ CH₃SO₄⁻ | Cr | Ethylene glycol | 596 | Blackish purple powder |
| 22 | NO₂, Br, OH (phenyl) | —C₄H₈N⁺(CH₃)₃ Br⁻ | Cr | Methyl cellosolve | 592 | Black powder |
| 23 | Cl, Cl, Cl, OH (phenyl) | —CH₂N⁺(CH₃)₃ Cl⁻ | Cr | Triethanolamine | 582 | Black powder |
| 24 | NHCOCH₃, OH (phenyl) | —CH₂N⁺(pyridine) Cl⁻ | Cr | n-Butanol | 587 | Blackish blue powder |
| 25 | H₃COOC—(phenyl)—OH | —CH₂N⁺(CH₃)₃ CH₃SO₄⁻ | Cr | Ethylene glycol | 594 | Black powder |

TABLE 1-continued

Structure:
$$\text{A—N=N} \begin{array}{c} \text{B—OCHN—[naphthalene]} \\ \text{HO} \end{array}$$

| Examples | Monoazo compound | | Central metal | Complexing solvent | Wavelength at the maximum absorption (nm) | Outer appearance |
|---|---|---|---|---|---|---|
| 26 | A: H₂NOC—[phenyl]—OH | B: —CH₂N⁺(CH₃)₃  Cl⁻ | Cr | Ethylene glycol | 593 | Black powder |
| 27 | A: [phenyl with Cl, Cl, OH] | B: —CH₂N⁺(CH₃)₃  Cl⁻ | Cr | n-Butanol | 592 | Black powder |
| 28 | A: H₃C—[phenyl with Br]—OH | B: —CH₂N⁺(CH₃)₂(C₄H₉)  Br⁻ | Cr | Ethylene glycol | 586 | Blackish purple powder |
| 29 | A: [phenyl with COCH₃, OH] | B: —CH₂N⁺(pyridine)  Cl⁻ | Cr | Methyl cellosolve | 590 | Blackish blue powder |
| 30 | A: H₂NO₂S—[phenyl]—OH | B: —CH₂N⁺(CH₃)₃  I⁻ | Cr | Methyl cellosolve | 593 | Black powder |
| 31 | A: [phenyl with CH₃, OH] | B: —C₃H₆N⁺(CH₃)₃  Cl⁻ | Cr | Ethylene glycol | 585 | Black powder |
| 32 | A: O₂N—[phenyl]—OH | B: —CH₂N⁺(C₂H₅)₃  Br⁻ | Cr | Dimethylformamide | 616 | Black powder |

EXAMPLE 33

15.4 Parts of 5-nitro-2-aminophenol was mixed with 26 parts of concentrated hydrochloric acid and 250 parts of water, and the mixture was cooled with ice to a temperature of from 0° to 5° C. After an addition of 6.9 parts of sodium nitrite, the mixture was stirred at the same temperature for 1.5 hours for diazotization. The diazo compound thus obtained was subjected to a coupling reaction by pouring it into a solution comprising 400 parts of water, 10 parts of sodium hydroxide and 39.9 parts of N,N,N-trimethyl-N-3-(3-hydroxy-2-naphthamido)propylammonium methylsulfate at a temperature of from 0° to 5° C. Then, a monoazo compound represented by the formula:

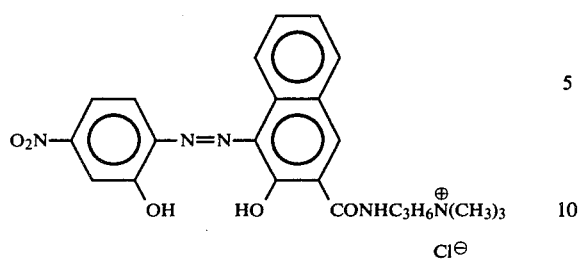

was isolated. This monoazo compound was dissolved in 150 parts of methyl cellosolve, and 17.5 parts of sodium chromium salicylate was added thereto. The mixture was stirred at from 90° to 95° C. for 2 hours for a chromium-introducing reaction. Then, the reaction mixture was cooled to 25° C., and hydrochloric acid was added to acidify the mixture. Then, the product was isolated and dried under reduced pressure at a temperature of from 50° to 60° C. to obtain 56 parts of a chromium complex having the following formula as a blackish purple powder:

lated by filtration, with dimethylsufuric acid in methanol, to a quaternary ammonium form. Further, the amide compound may also be readily prepared via 2-hydroxy-3-napthoic acid chloride.

EXAMPLE 34

62.8 Parts of a monoazo dyestuff of the formula:

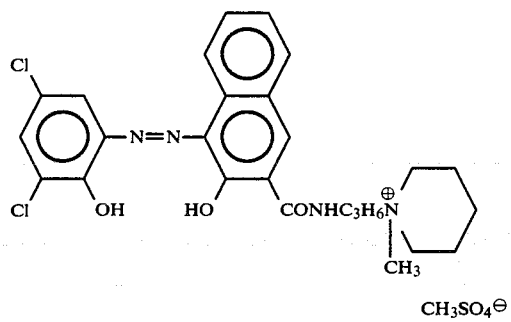

obtained in the same manner as in Example 33, was dissolved in 200 parts of dimethylformamide, and after

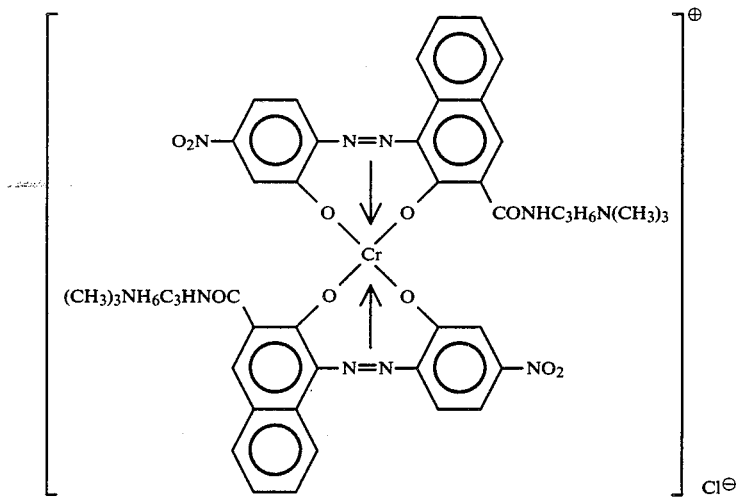

The visible ray absorption spectrum of this chromium complex was measured in a dimethylformamide solvent, whereby the wavelength at the maximum absorption was 599 nm.

The coupling component used in this Example was obtained by reacting methyl 2-hydroxy-3-naphthoate with dimethylamino propylamine in toluene to obtain N,N-dimethyl-N-3-(3-hydroxy-2-naphthamido)-propylamine, and converting the amide compound isoan addition of 30.5 parts of chromium acetate (45% solution), the mixture was stirred at a temperature of from 100° to 105° C. for 3 hours for a chromium-introducing reaction. Then, the mixture was treated in the same manner as in Example 33 to obtain 54.3 parts of a chromium complex of the following formula as a blackish purple fine powder:

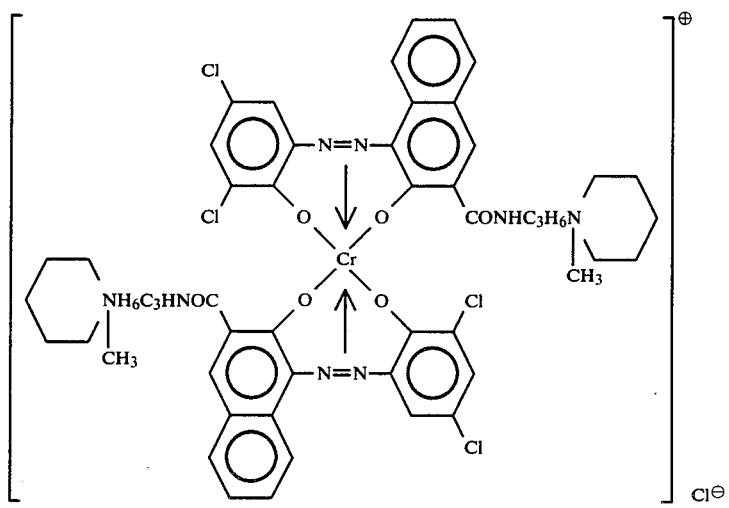

The visible ray absorption spectrum of this chromium complex was measured in a dimethylformamide solvent, whereby the wavelength at the maximum absorption was 602 nm.

EXAMPLES 35 to 58

In the same manner as in Examples 33 and 34, metal complexes were prepared. The structures, the wavelengths at the maximum absorption and the outer appearances of these metal complexes are shown in Table 2.

TABLE 2

| Examples | Monoazo compound (A) | CONH—B | Central metal | Complexing solvent | Wavelength at the maximum absorption (nm) | Outer appearance |
|---|---|---|---|---|---|---|
| 35 | A: Br, OH (phenyl) | B: —$C_3H_6N(CH_3)_3$ $Cl^\ominus$ | Cr | Ethylene glycol | 595 | Black powder |
| 36 | A: $NO_2$, OH (phenyl) | B: —$C_3H_6N$(piperidinyl)$CH_3$ $Cl^\ominus$ | Cr | Ethylene glycol | 591 | Blackish blue powder |
| 37 | A: $NO_2$, Cl, OH (phenyl) | B: —$C_2H_4N(C_2H_5)_3$ $Cl^\ominus$ | Cr | Dimethylformamide | 601 | Blackish purple powder |
| 38 | A: $COC_3H_7$, Cl, OH (phenyl) | B: —$C_3H_6N$(piperidinyl) $Br^\ominus$ | Cr | Ethylene glycol | 587 | Black powder |

TABLE 2-continued

A—N=N— (naphthalene with HO and CONH—B)

| Examples | Monoazo compound | B | Central metal | Complexing solvent | Wavelength at the maximum absorption (nm) | Outer appearance |
|---|---|---|---|---|---|---|
| 39 | A: 2,4-dinitro, 6-methyl phenol (NO₂, NO₂, OH) | —C₄H₈N⁺(CH₃)₃ Cl⁻ | Cr | Water Ethylene glycol | 598 | Blackish blue powder |
| 40 | A: 3-OCH₃, 4-OH phenyl | —C₂H₄N⁺(CH₃)₃ Cl⁻ | Co | Ethylene glycol | 572 | Blackish blue powder |
| 41 | A: 3-OCH₃, 4-OH phenyl | —C₂H₄N⁺(C₂H₅)₂CH₃ Cl⁻ | Cr | n-Butanol | 587 | Black powder |
| 42 | A: 3,5-dimethyl, 4-OH phenyl | —C₂H₄N⁺(piperidine)CH₃ I⁻ | Cr | Ethylene glycol | 586 | Black powder |
| 43 | A: 3-NO₂, 4-OH phenyl | —C₃H₆N⁺(CH₃)₃ CH₃SO₄⁻ | Cr | Ethylene glycol | 593 | Blackish blue powder |
| 44 | A: 3,5-dichloro, 4-OH phenyl | —C₃H₆N⁺(C₄H₉)₂CH₃ Cl⁻ | Co | Methyl cellosolve | 571 | Blackish purple powder |
| 45 | A: 3-I, 4-OH phenyl | —C₃H₆N⁺(CH₃)₂C₂H₅ Cl⁻ | Cr | n-Butanol | 590 | Black powder |

TABLE 2-continued

Structure at top of table:

$$A-N=N-\underset{\underset{HO\quad CONH-B}{}}{\text{naphthalene}}$$

| Examples | Monoazo compound A | B | Central metal | Complexing solvent | Wavelength at the maximum absorption (nm) | Outer appearance |
|---|---|---|---|---|---|---|
| 46 | 2,3,6-trichloro-4-methyl-5-hydroxyphenyl (Cl, Cl, CH₃, Cl, OH) | $-C_2H_4\overset{\oplus}{N}(CH_3)(\text{piperidinyl})\ Cl^{\ominus}$ | Cr | Ethylene glycol | 610 | Black powder |
| 47 | 4-NHCOCH₃, 3-CH₃, 6-OH phenyl | $-C_2H_4\overset{\oplus}{N}C_5H_5\ Cl^{\ominus}$ (pyridinium) | Cr | Ethylene glycol | 587 | Black powder |
| 48 | 4-CONH₂, 3-CH₃, 6-OH phenyl | $-C_3H_6\overset{\oplus}{N}(CH_3)(\text{morpholinyl})\ I^{\ominus}$ | Cr | Ethylene glycol | 592 | Blackish blue powder |
| 49 | 4-CN, 3-CH₃, 6-OH phenyl | $-C_3H_6\overset{\oplus}{N}(C_3H_7)_2(CH_3)\ Cl^{\ominus}$ | Cr | Dimethylformamide | 595 | Blackish blue powder |
| 50 | 4-tC₈H₁₇, 3-CH₃, 6-OH phenyl | $-C_3H_6\overset{\oplus}{N}(CH_3)_3\ Cl^{\ominus}$ | Co | Triethanolamine | 568 | Blackish purple powder |
| 51 | 4-SO₂CH₃, 3-CH₃, 6-OH phenyl | $-C_3H_6\overset{\oplus}{N}(CH_3)_3\ Cl^{\ominus}$ | Cr | Water | 590 | Black powder |
| 52 | 4-NO₂, 3-CH₃, 5-Cl, 6-OH phenyl | $-C_2H_4\overset{\oplus}{N}(CH_3)_2(C_{18}H_{37})\ Cl^{\ominus}$ | Cr | Ethylene glycol | 598 | Black powder |
| 53 | 4-CONHC₂H₅, 3-CH₃, 6-OH phenyl | $-C_3H_6\overset{\oplus}{N}(CH_3)(C_2H_4OH)\ Cl^{\ominus}$ | Cr | Diethylene glycol | 586 | Blackish purple powder |

TABLE 2-continued

| Examples | Monoazo compound | | Central metal | Complexing solvent | Wavelength at the maximum absorption (nm) | Outer appearance |
|---|---|---|---|---|---|---|
| | | A—N=N— ... HO  CONH—B | | | | |
| 54 | A: O₂N—(Cl, OH substituted phenyl) | B: —C₂H₄N⁺(CH₃)₃  Br⁻ | Cr | Ethylene glycol | 593 | Black powder |
| 55 | A: H₃C—(OH substituted phenyl) | B: —C₃H₆N⁺(phenyl)  Cl⁻ | Cr | Dimethylformamide | 588 | Black powder |
| 56 | A: H₂NO₂S—(OH substituted phenyl) | B: —C₂H₄N⁺(C₂H₄OH)₂ , CH₃  Cl⁻ | Cr | Water | 592 | Black powder |
| 57 | A: H₃COOC—(OH substituted phenyl) | B: —C₂H₄N⁺(CH₃)₂ , C₁₂H₂₅  Cl⁻ | Cr | Dimethylformamide | 600 | Black powder |
| 58 | A: tC₄H₉—(OH substituted phenyl) | B: —C₂H₄N⁺(C₂H₅)₃  C₂H₅SO₄⁻ | Cr | Ethylene glycol | 594 | Blackish blue powder |

Now, the following Application Examples are given to illustrate the toners of the present invention.

Application Example 1

To 5 parts of the chromium complex obtained in Example 1, 100 parts of a styrene-n-butyl methacrylate copolymer and 5 parts of carbon black were added and thoroughly mixed. Then, the mixture was kneaded while heating and melting it. After cooling, the mixture was roughly pulverized in a mixer, and then finely pulverized by a high speed centrifugal pulverizer to obtain a positively chargeable fine toner. The toner was mixed with iron powder having a particle size of from 100 to 150 μm in a weight ratio of 5:100, and the mixture was used for a commercially available copying machine employing a zinc oxide photosensitive material, whereby a clear image free from fogging was obtained. The quantity of the electric charge of the toner was 22 μc/g on an average as measured by a blow off method, and the electric charge distribution was substantially uniform at a level of from 22 to 23 μc/g.

Application Examples 2 to 13

In the same manner as in Application Example 1, toners containing metal complexes and having compositions as identified in Table 3 were prepared. The electric chargeability of these toners was measured. The results are also shown in Table 3.

TABLE 3

| Application Examples | Composition of the developer | | Electric chargeability ($\mu c/g$) |
|---|---|---|---|
| | Metal complex | Other components | |
| 2 | 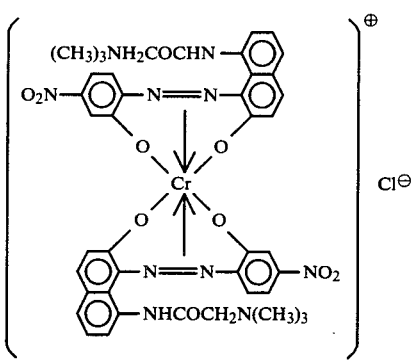 0.2 part | Styrene-n-butyl methacrylate copolymer 20 parts<br>Carbon black 1 part<br>Iron powder carrier 500 parts | 18.3 |
| 3 | 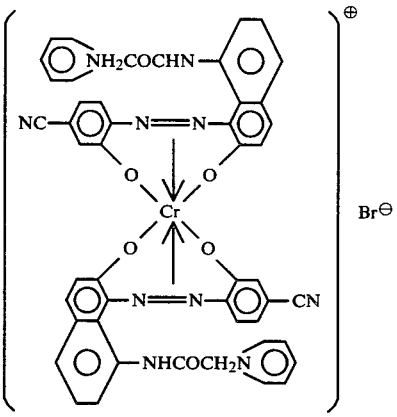 0.5 part | Phenol resin 12 parts<br>Polyester resin 9 parts<br>Carbon black 1.5 parts<br>Iron powder carrier 500 parts | 16.8 |
| 4 | 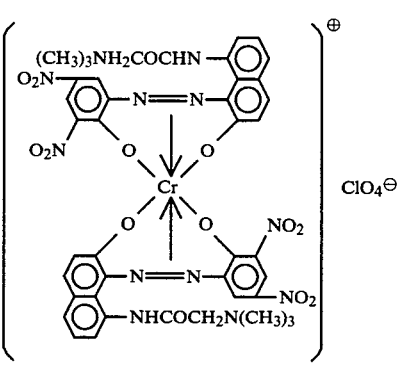 1 part | Polyethylene wax 50 parts<br>Ethylene-vinyl acetate copolymer 40 parts<br>Magnetite 50 parts | 17.3 |

TABLE 3-continued

| Application Examples | Composition of the developer | | Electric chargeabilty ($\mu c/g$) |
|---|---|---|---|
| | Metal complex | Other components | |
| 5 | 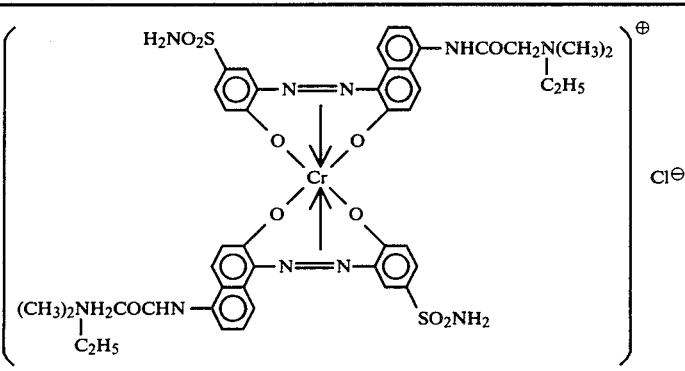  0.1 part | Styrene-ethylhexyl methacrylate copolymer 40 parts<br>Polyester resin 5 parts<br>Silicone wax 4 parts<br>Carbon black 0.1 part<br>Silicone resin-coated iron powder carrier 700 parts | 10.3 |
| 6 | 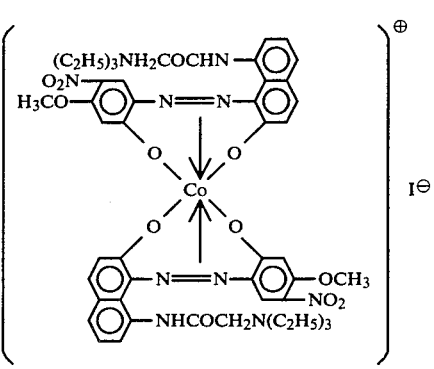  0.2 part | Styrene-acryl copolymer 20 parts<br>Carbon black 2 parts<br>Glass beads carrier 1000 parts | 15.4 |
| 7 | 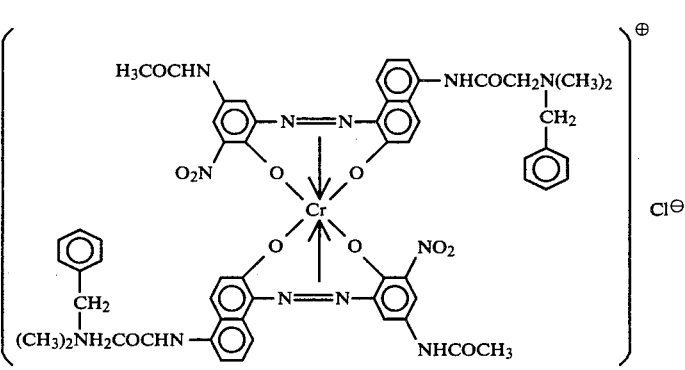  5 parts | Styrene-ethyl methacrylate copolymer 100 parts<br>Iron powder carrier 2000 parts | 13.2 |
| 8 | 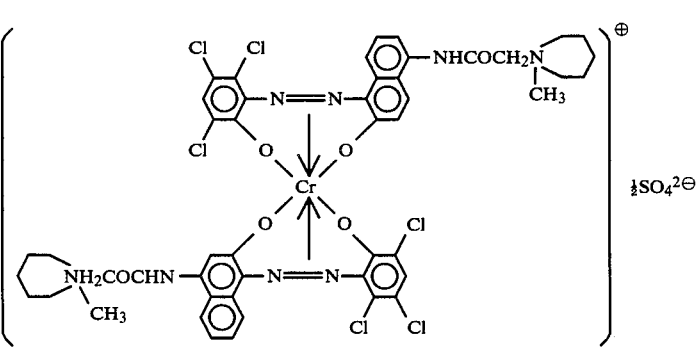  2 parts | Styrene-butadiene copolymer 50 parts<br>Carbon black 5 parts<br>Iron powder carrier 1500 parts | 18.9 |

TABLE 3-continued

| Application Examples | Composition of the developer | | Electric chargeability ($\mu c/g$) |
|---|---|---|---|
| | Metal complex | Other components | |
| 9 | 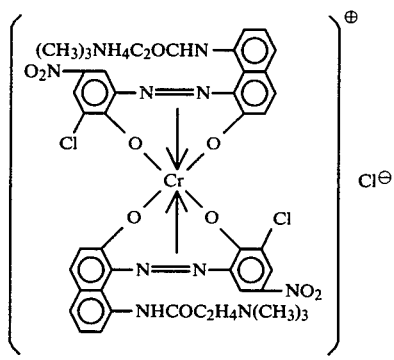 0.5 part | Styrene-n-butyl methacrylate copolymer 12 parts<br>C.I. pigment blue-15 0.1 part<br>Iron powder carrier 500 parts | 17.4 |
| 10 | 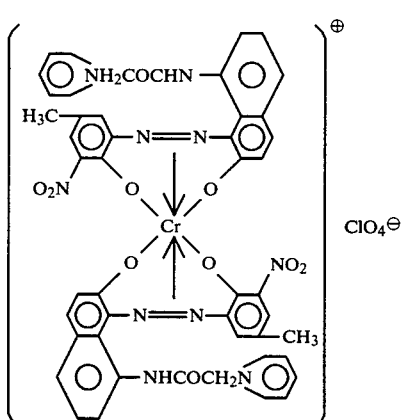 1 part | Polyester resin 50 parts<br>Carbon black 5 parts<br>Iron powder carrier 1500 parts | 12.1 |
| 11 | 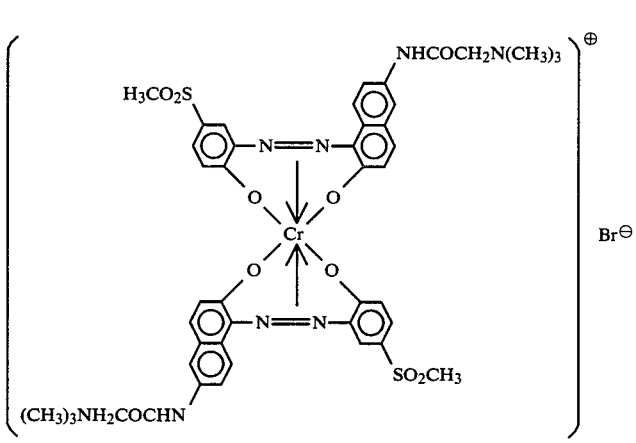 1 part | Styrene-methyl acrylate copolymer 50 parts<br>C.I. pigment black 1 3 parts<br>Iron powder carrier 1500 parts | 12.8 |

TABLE 3-continued

| Application Examples | Composition of the developer | | Electric chargeability (μc/g) |
|---|---|---|---|
| | Metal complex | Other components | |
| 12 | [Chromium complex structure with morpholine, NH₂COCHN, CH₃, O₂N, H₃COOC, N=N, Cr coordinated with O ligands, COOCH₃, NO₂, CH₃, NHCOCH₂N-morpholine groups]⊕ Cl⊖<br>0.5 part | Epoxy resin 30 parts<br>Carbon black 3 parts<br>Iron powder carrier 1000 parts | 11.1 |
| 13 | [Chromium complex structure with O₂N, H₉C₄HNOC, Cl, N=N, NHCOCH₂N(CH₃)₃, Cr coordinated with O ligands, (CH₃)₃H₂COCHN, N=N, Cl, CONHC₄H₉, NO₂ groups]⊕ Cl⊖<br>0.5 part | Polyvinyl butyral resin 10 parts<br>Carbon black 1 part<br>Iron powder carrier 250 parts | 14.2 |

Appliction Example 14

To 1 part of a chromium complex represented by the formula:

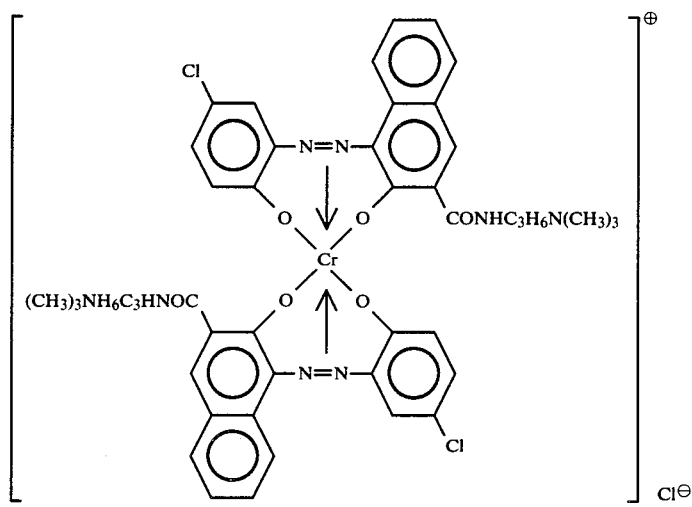

100 parts of a styrene-n-butyl methacrylate copolymer and 8 parts of carbon black were added and thoroughly mixed. The mixture was then kneaded while heating and melting it. After cooling, the mixture was roughly pulverized in a mixer, and then finely pulverized by a high speed centrifugal pulverizer to obtain a positively chargeable fine toner. The toner was mixed with iron powder having a particle size of from 100 to 150 μm in a weight ratio of 5:100, and the mixture was used for a commercially available copying machine employing a zinc oxide photosensitive material, whereby a clear image free from fogging was obtained. The quantity of the electric charge of the toner was 17.5 μc/g on an average as measured by a blow off method, and the electric charge distribution was substantially uniform at a level of from 17.0 to 18.3 μc/g.

Application Examples 15 to 29

In the same manner as in Example 14, toners containing metal complexes and having compositions as identified in Table 4 were obtained. The electric chargeability of these toners were measured. The results are also shown in the Table 4.

TABLE 4

| Application Examples | Composition of the developer | | Electric chargeability (μc/g) |
|---|---|---|---|
| | Metal complex | Other components | |
| 15 | (structure shown) 0.2 part | Styrene-ethylhexyl methacrylate 40 parts, Polyester resin 5 parts, Silicone wax 3 parts, Carbon black 2 parts, Iron powder carrier 1000 parts | 14.8 |

TABLE 4-continued

| Application Examples | Composition of the developer | | Electric chargeability ($\mu$c/g) |
|---|---|---|---|
| | Metal complex | Other components | |
| 16 | 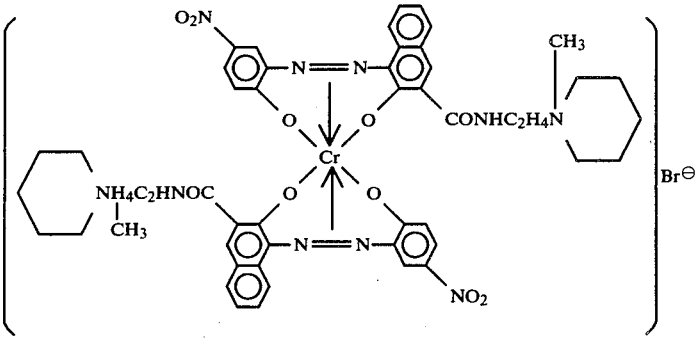<br>0.5 part | Styrene-acryl copolymer 30 parts<br>Carbon black 3 parts<br>Glass beads 1000 parts<br>carrier | 18.9 |
| 17 | 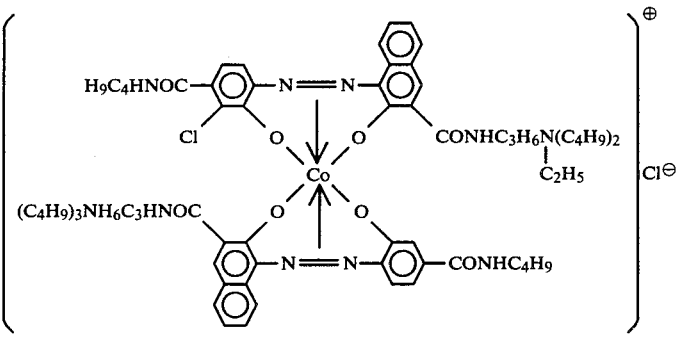<br>10 parts | Styrene-methyl methacrylate copolymer 50 parts<br>Silicone resin-coated iron powder carrier 1500 parts | 16.3 |
| 18 | 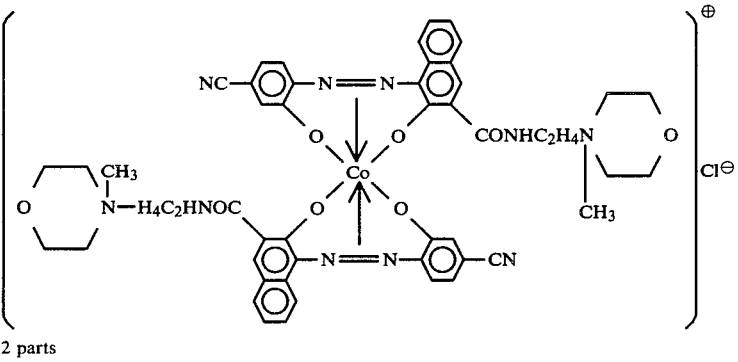<br>2 parts | Polyvinyl butyral resin 200 parts<br>Carbon black 10 parts<br>Iron powder carrier 2000 parts | 17.4 |
| 19 | 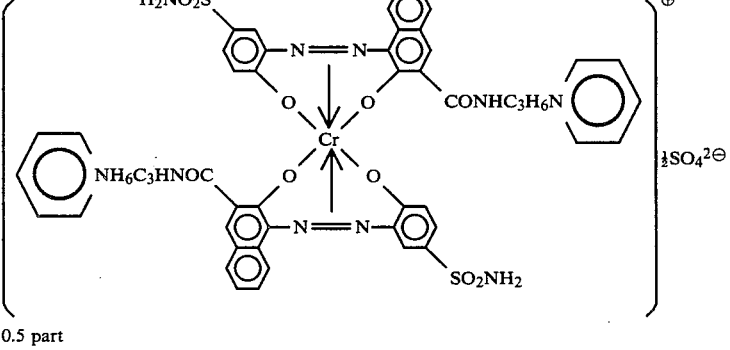<br>0.5 part | Bisphenol type epoxy resin 50 parts<br>Carbon black 2 parts<br>Iron powder carrier 1000 parts | 18.6 |

TABLE 4-continued

| Application Examples | Composition of the developer | | Electric chargeability ($\mu c/g$) |
|---|---|---|---|
| | Metal complex | Other components | |
| 20 | 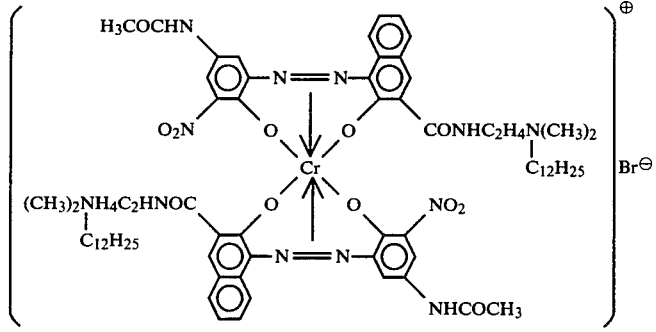
0.5 part | Styrene resin 50 parts<br>Carbon black 2 parts<br>Iron powder carrier 1000 parts | 14.0 |
| 21 | 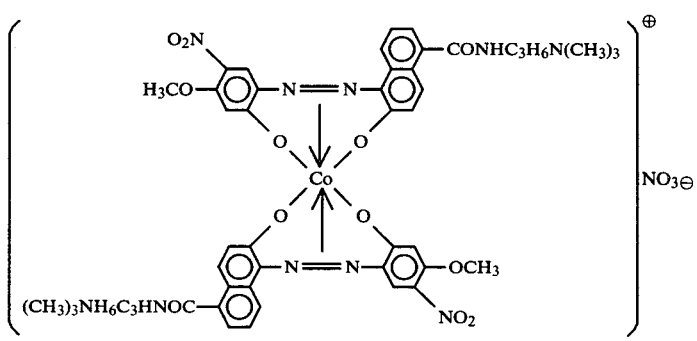
0.2 part | Styrene-butyl methacrylate copolymer 30 parts<br>Carbon black 2 parts<br>Iron powder carrier 800 parts | 15.0 |
| 22 | 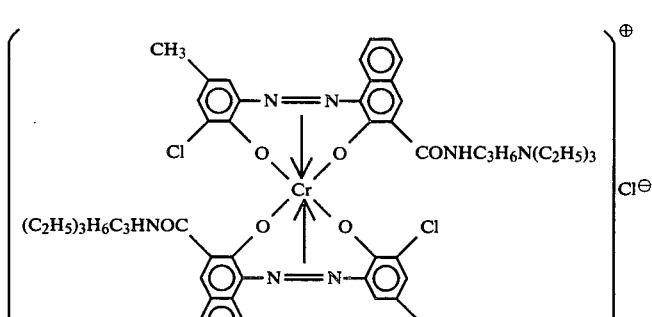
0.5 part | Phenol resin 15 parts<br>Polyester resin 8 parts<br>Carbon black 2 parts<br>Silicon resin-coated iron powder carrier 700 parts | 21.3 |
| 23 | 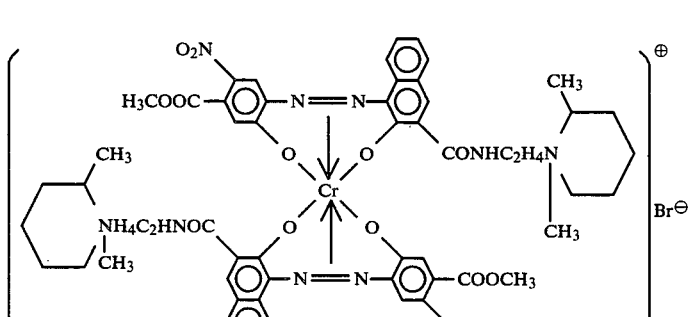
1 part | Polyethylene wax 50 parts<br>Ethylene-vinyl acetate copolymer 40 parts<br>Magnetite 30 parts | 18.5 |

TABLE 4-continued

| Application Examples | Composition of the developer | | Electric chargeability (μc/g) |
|---|---|---|---|
| | Metal complex | Other components | |
| 24 | 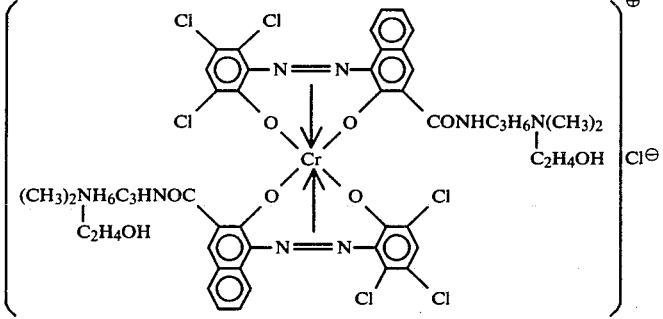 0.5 part | Styrene-ethylhexyl methacrylate copolymer 20 parts<br>Carbon black 1 part<br>Ironpowder carrier 600 parts | 23.2 |
| 25 | 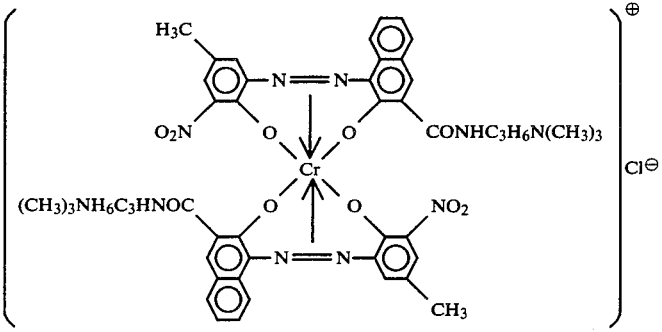 0.2 part | Maleic acid resin 50 parts<br>Carbon black 5 parts<br>Iron powder carrier 1000 parts | 16.4 |
| 26 | 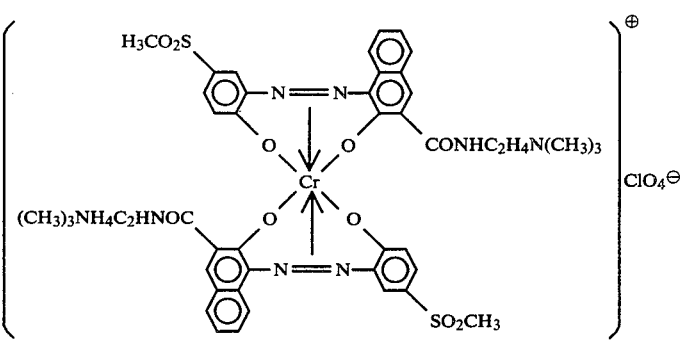 0.1 part | Styrene-ethyl methacrylate copolymer 30 parts<br>Carbon black 3 parts<br>Iron powder carrier 500 parts | 18.3 |
| 27 | 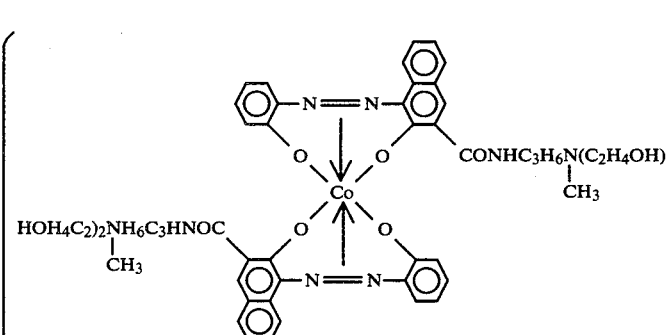 1 part | Styrene-butadiene copolymer 50 parts<br>Carbon black 5 parts<br>Iron powder carrier 1500 parts | 16.7 |

TABLE 4-continued

| Application Examples | Composition of the developer | | Electric chargeability (μc/g) |
|---|---|---|---|
| | Metal complex | Other components | |
| 28 | 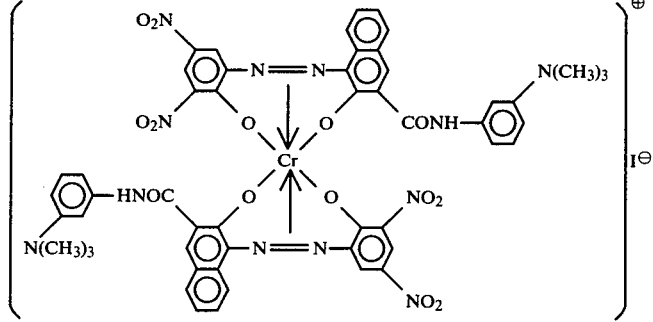 0.4 part | Polyester resin 12 parts<br>C.I. pigment 0.2 part<br>blue-15<br>Silicone resin- 400 parts<br>coated iron<br>powder carrier | 18.5 |
| 29 | 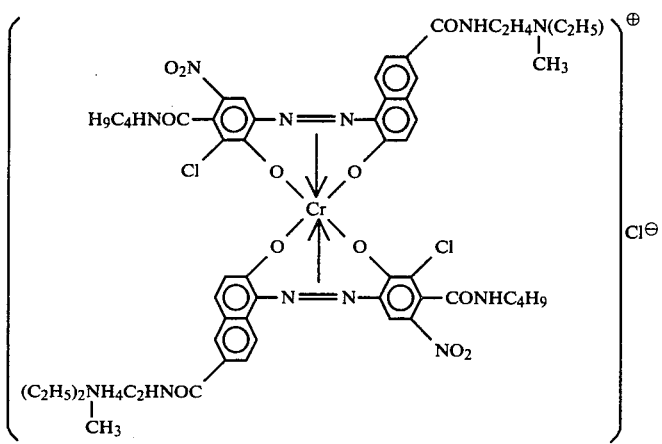 2 parts | Styrene-butyl 100 parts<br>methacrylate 5 parts<br>copolymer<br>Carbon black 300 parts<br>Iron powder<br>carrier | 17.2 |

I claim:

1. A symmetric 2:1 metal complex represented by the general formula:

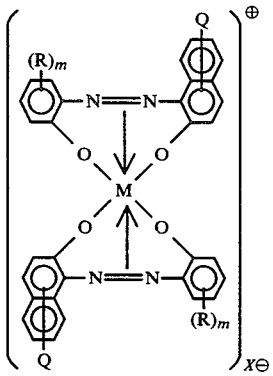

where R is a hydrogen atom, an alkyl group having from 1 to 10 carbon atoms, an alkoxy group having from 1 to 4 carbon atoms, an alkoxycarbonyl group having from 2 to 5 carbon atoms, an acyl group having from 2 to 5 carbon atoms, an aminocarbonyl group, an alkylaminocarbonyl group having from 2 to 5 carbon atoms, an alkylsulfonyl group having from 1 to 3 carbon atoms, an aminosulfonyl group, an acylamino group having from 2 to 5 carbon atoms, a nitro group, a cyano group or a halogen atom, m is an integer of from 1 to 4, when m is 2 or more, the plurality of R may be the same or different substituents, Q is —NHCO—Y—Z or —CONH—Y—Z (where Y is an alkylene group having from 1 to 4 carbon atoms, and Z is a quaternary ammonium group), M is a chromium atom or a cobalt atom, and $X^{\ominus}$ is an anion.

2. The metal complex according to claim 1, wherein $X^{\ominus}$ is a halogen ion.

3. An electrophotographic toner containing from 1 to 50% by weight of the metal complex of the formula I as defined in claim 1, and from 50 to 99% by weight of a resin.

4. The electrophotographic toner according to claim 3, wherein the resin is a styrene polymer, a substituted styrene polymer, a styrene-substituted styrene copolymer, a styrene-acrylate copolymer, a styrene-methacrylate copolymer, a styrene-acrylonitrile copolymer, a polyvinyl chloride resin, a polyethylene resin, a silicone resin, a polyester resin, a polyurethane resin, a polyamide resin, an epoxy resin, a modified rosin or a phenol resin.

* * * * *